(12) United States Patent
Lenger

(10) Patent No.: US 10,204,473 B2
(45) Date of Patent: Feb. 12, 2019

(54) SYSTEMS AND METHODS OF GAMING MACHINE IMAGE TRANSITIONS

(71) Applicant: Aristocrat Technologies Australia Pty Limited, North Ryde, NSW (AU)

(72) Inventor: Drazen Lenger, Rosebery (AU)

(73) Assignee: Aristocrat Technologies Australia Pty Limited, North Ryde, NSW (AU)

(*) Notice: Subject to any disclaimer, the term of this patent is extended or adjusted under 35 U.S.C. 154(b) by 0 days.

(21) Appl. No.: 15/334,057

(22) Filed: Oct. 25, 2016

(65) Prior Publication Data

US 2017/0103601 A1 Apr. 13, 2017

Related U.S. Application Data

(63) Continuation of application No. 13/678,004, filed on Nov. 15, 2012, now Pat. No. 9,474,972, which is a (Continued)

(30) Foreign Application Priority Data

Feb. 24, 2003 (AU) ................................ 2003900809

(51) Int. Cl.
G07F 17/32 (2006.01)
A63F 13/52 (2014.01)
G06T 13/00 (2011.01)

(52) U.S. Cl.
CPC .......... *G07F 17/3211* (2013.01); *A63F 13/52* (2014.09); *G06T 13/00* (2013.01);
(Continued)

(58) Field of Classification Search
CPC .......... A63F 13/02; A63F 13/04; A63F 13/06; A63F 13/08; A63F 13/10; A63F 13/12;
(Continued)

(56) References Cited

U.S. PATENT DOCUMENTS 5,101,364 A 3/1992 Davenport et al.
5,353,391 A * 10/1994 Cohen .................. G11B 27/034
345/619

(Continued)

FOREIGN PATENT DOCUMENTS

AU 200179477 A1 5/2002
WO WO2001074055 A1 10/2001

OTHER PUBLICATIONS

"The Silicon Gaming Odyssey Slot Machine" (Levinthal, et al., 1063-6390/97, 1997, IEEE Xplore database).*

(Continued)

*Primary Examiner* — Omkar Deodhar
*Assistant Examiner* — Matthew D. Hoel
(74) *Attorney, Agent, or Firm* — Armstrong Teasdale LLP

(57) ABSTRACT

A graphics system for changing images on a gaming machine display, having a transition library of transition types, a graphics engine and a control means. The graphics engine applies a selected transition type from the transition library to at least one of at least two images for determining the way in which a substitution of one of the images by the other of the images occurs and initializes transition data for effecting an incremental substitution of the one image by the other image. The control means modifies the transition data such that, when the selected transition type is being effected, an incremental substitution of at least a part of the one image by the other image occurs serially until the one image has been substituted by the other image on the gaming machine display.

16 Claims, 18 Drawing Sheets

Related U.S. Application Data continuation of application No. 10/546,859, filed as application No. PCT/AU2004/000230 on Feb. 24, 2004, now abandoned.

(52) U.S. Cl.
CPC .......... *G07F 17/32* (2013.01); *G07F 17/3202* (2013.01); *G07F 17/3227* (2013.01); *A63F 2300/66* (2013.01)

(58) Field of Classification Search
CPC ............ A63F 2300/66; A63F 2300/663; A63F 2300/6638; A63F 2300/6653; A63F 2300/6692; A63F 13/52; G07F 17/32; G07F 17/3202; G07F 17/3211; G07F 17/3227; G06T 13/00
See application file for complete search history.

(56) References Cited

U.S. PATENT DOCUMENTS

| | | | | |
|---|---|---|---|---|
| 5,359,712 A * | 10/1994 | Cohen | ................. | G11B 27/034 348/E5.051 |
| 5,491,778 A * | 2/1996 | Gordon et al. | ................ | 345/640 |
| 5,640,522 A * | 6/1997 | Warrin | ................. | G06F 3/0481 345/619 |
| 5,664,082 A | 9/1997 | Chen et al. | | |
| 5,680,535 A | 10/1997 | Harbin et al. | | |
| 5,692,117 A * | 11/1997 | Berend | ................. | G06T 11/001 345/475 |
| 5,701,385 A * | 12/1997 | Katsuyama | .......... | G11B 17/056 386/329 |
| 5,726,717 A * | 3/1998 | Peters | ................. | G11B 27/034 348/588 |
| 5,793,985 A | 8/1998 | Natarajan | | |
| 5,810,665 A | 9/1998 | Takemoto et al. | | |
| 5,818,462 A * | 10/1998 | Marks | .................... | G06T 13/20 345/473 |
| 5,848,199 A * | 12/1998 | Naqvi | ....................... | G06T 3/00 382/276 |
| 5,933,834 A | 8/1999 | Aichelen | | |
| 5,959,690 A | 9/1999 | Toebes, VIII | | |
| 5,982,389 A | 11/1999 | Guenter | | |
| 5,987,211 A * | 11/1999 | Abecassis | ............... | A63F 13/10 348/E5.102 |
| 6,157,933 A | 12/2000 | Celi et al. | | |
| 6,167,083 A * | 12/2000 | Sporer | .................... | G06T 9/004 375/240.01 |
| 6,177,953 B1 * | 1/2001 | Vachette | ............ | G02B 27/2214 348/59 |
| 6,269,216 B1 * | 7/2001 | Abecassis | ............... | A63F 13/10 348/E5.102 |
| 6,269,366 B1 | 7/2001 | Romano | | |
| 6,270,411 B1 | 8/2001 | Gura | | |
| 6,290,600 B1 | 9/2001 | Glasson | | |
| 6,337,880 B1 * | 1/2002 | Cornog | ................. | G06T 9/004 375/240.01 |
| 6,375,570 B1 | 4/2002 | Poole | | |
| 6,388,661 B1 | 5/2002 | Richards | | |
| 6,405,464 B1 * | 6/2002 | Gulick, Jr. | ......... | G02B 27/2214 40/454 |
| 6,433,839 B1 | 8/2002 | Siefken | | |
| 6,517,432 B1 | 2/2003 | Jaffe | | |
| 6,551,187 B1 | 4/2003 | Jaffe | | |
| 6,570,624 B2 * | 5/2003 | Cornog | ................... | G06T 13/80 348/446 |
| 6,580,466 B2 | 6/2003 | Siefken | | |
| 6,628,247 B2 | 9/2003 | Toffolo | | |
| 6,628,283 B1 * | 9/2003 | Gardner | .............. | G06F 3/04845 345/427 |
| 6,731,313 B1 | 5/2004 | Kaminkow | | |
| 6,837,790 B1 * | 1/2005 | Kaminkow | ......... | G07F 17/3211 463/20 |
| 6,972,773 B2 * | 12/2005 | Matsui | ................. | G09G 3/2033 345/207 |
| 6,980,594 B2 * | 12/2005 | Wang | ................... | G11B 27/031 348/E5.051 |
| 7,002,583 B2 * | 2/2006 | Rabb, III | .............. | G06T 3/0093 345/473 |
| 7,106,334 B2 * | 9/2006 | Imagawa | ................ | G06T 13/40 345/474 |
| 7,148,908 B2 * | 12/2006 | Riek | ............... | H04N 21/23424 345/646 |
| 7,149,974 B2 * | 12/2006 | Girgensohn | ...... | G06F 17/30802 715/723 |
| 7,156,740 B2 * | 1/2007 | Kaminkow | ......... | G07F 17/3211 463/16 |
| 7,269,802 B1 | 9/2007 | Kurzweil | | |
| 7,302,113 B2 | 11/2007 | Pilu | | |
| 7,379,065 B2 * | 5/2008 | Rabb, III | .............. | G06T 3/0093 345/419 |
| 7,526,736 B2 | 4/2009 | Kaminkow et al. | | |
| 7,699,699 B2 | 4/2010 | Gilliland et al. | | |
| 7,721,209 B2 * | 5/2010 | Tilton | ..................... | G06T 13/80 715/730 |
| 7,735,026 B2 | 6/2010 | Kurzweil | | |
| 7,785,191 B2 | 8/2010 | Marks et al. | | |
| 7,855,724 B2 * | 12/2010 | Larsen | ............. | G06F 17/30056 345/428 |
| 7,980,936 B2 * | 7/2011 | Mead | ...................... | G07F 17/32 463/16 |
| 8,271,333 B1 | 9/2012 | Grigsby | | |
| 8,427,484 B1 * | 4/2013 | Kass | ...................... | G06T 13/40 345/419 |
| 2002/0057386 A1 * | 5/2002 | Otera | .......................... | 348/744 |
| 2002/0061065 A1 | 5/2002 | Moore | | |
| 2002/0075284 A1 * | 6/2002 | Rabb, III | .............. | G06T 3/0093 345/646 |
| 2002/0126224 A1 | 9/2002 | Lienhart | | |
| 2003/0064801 A1 | 4/2003 | Breckner et al. | | |
| 2005/0054442 A1 * | 3/2005 | Anderson | ............... | G07F 17/32 463/35 |
| 2005/0181347 A1 | 8/2005 | Barnes et al. | | |
| 2006/0009286 A1 | 1/2006 | Durham et al. | | |
| 2017/0032377 A1 * | 2/2017 | Navaratnam | ..... | G06F 17/30654 |

OTHER PUBLICATIONS

"ScreensaverMaker—Make Your Own Screensaver!" http://web.archive.org/web/20021126232239/http://www.scrmaker.com, Nov. 26, 2002. (See whole document.).

* cited by examiner

Figure - Abstract view of how scatter transition separates image.

Figure . drawing procedure for scatter once calculations have been done

SYSTEMS AND METHODS OF GAMING MACHINE IMAGE TRANSITIONS

CROSS REFERENCE TO RELATED APPLICATIONS

This application is a continuation of prior U.S. Pat. No. 9,474,972 issued on Oct. 25, 2016 for "GAMING MACHINE TRANSITIONS", which is hereby incorporated by reference in its entirety, and which claims the benefit of priority to U.S. application Ser. No. 10/546,859 filed Oct. 4, 2006 for "GAMING MACHINE TRANSITIONS", which is incorporated by reference in its entirety.

BACKGROUND

The subject matter of the present disclosure relates to a system and method for changing images on a gaming machine display. The options available to replace a gaming machine display image with different image in an interesting or aesthetically pleasing manner are limited. Some known systems use an instantaneous change or some form of pre-generated animation. These methods, apart from consuming a large amount of EPROM space, are unwieldy and cumbersome given that the beginning and end images must be known before run-time. Therefore, a need exists for alternative methods to change images on a gaming machine display without using pre-generated animations in order to reduce EPROM space consumed and in order to maintain or increase player enjoyment.

SUMMARY

Systems, methods, and articles of manufacture for electronic gaming machine image transitions are disclosed. In a first aspect, a graphics system for changing images on a gaming machine display is provided. The system includes a transition library of transition types. The system also includes a graphics engine to apply a selected transition type from the transition library to at least one of at least two images for deter fining the way in which a substitution of one of the images by the other of the images occurs and for initializing transition data for effecting an incremental substitution of the one image by the other image. The system further includes a control means for modifying the transition data such that, when the selected transition type is being affected, an incremental substitution of at least a part of the one image by the other image occurs serially until the one image has been substituted by the other image on the gaming machine display.

In a second aspect, a method for changing images on a gaming machine display is provided. The method includes selecting a transition from a transition library of transition types. The method also includes applying the selected transition to at least one of at least two images for determining the way in which a substitution of one of the images by the other of the images occurs. The method further includes initializing transition data for effecting an incremental substitution of the one image by the other image. The method also includes modifying the transition data such that, when the selected transition type is being affected, an incremental substitution of at least a part of the one image by the other image occurs serially until the one image has been substituted by the other image on the gaming machine display.

In a third aspect, a gaming machine having a gaming machine display is provided. The gaming machine includes a graphics system to change images on the gaming machine display. The graphics system includes a transition library of transition types. The graphics system also includes a graphics engine for applying a selected transition type from the transition library to at least one of at least two images for determining the way in which a substitution of one of the images by the other of the images occurs and for initializing transition data for effecting an incremental substitution of the one image by the other image. The graphics system further includes a control means for modifying the transition data such that, when the selected transition type is being affected, an incremental substitution of at least a part of the one image by the other image occurs serially until the one image has been substituted by the other image on the gaming machine display.

BRIEF DESCRIPTION OF THE DRAWINGS

Certain embodiments of the present disclosure will now be described, by way of example only, with reference to the accompanying drawings, in which.

Figure 1:
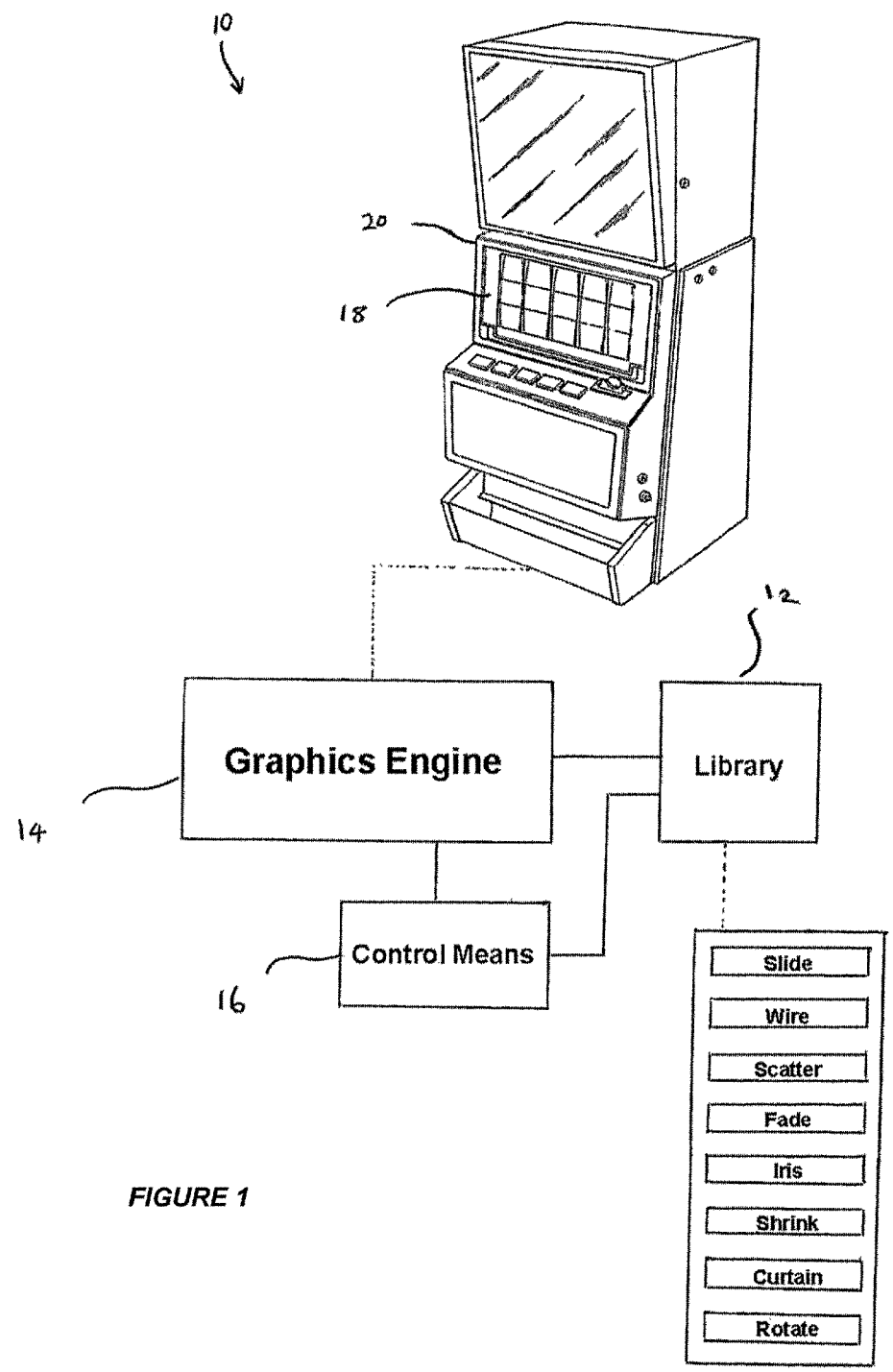
FIG. 1 is a block diagram of the graphics system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, etc. storing the software and/or firmware.

Referring to the drawings, a method and a gaming system for implementing the method are shown. The present gaming system operates such that gaming machine image transitions enable gaming machines to change images on the gaming machine display in a variety of ways over a variable time period without using pre-generated animations. That is, any image that exists on a gaming machine display can be made to disappear and reappear aesthetically at run-time. Preferably, by placing a second image under the first image before the start of a transition, the second image can be exposed and effectively replace the first image using any of the transitions provided by the graphics engine.

FIG. 1 is a block diagram of a graphics system 10 for a gaming machine 20 that includes a display 18. Graphics system 10 includes a transition library 12 that stores various types of transitions, for example, slide, wipe, scatter, fade, iris, shrink, curtain, and rotate transitions. Graphics system 10 also provides a graphics engine 14 to apply a selected transition type from transition library 12 to one of two images for determining a method in which a substitution of a first image by a second image occurs. Graphics engine 14 also initializes transition data (t_data) for effecting an incremental removal of the first image to reveal the second image. A control means 16 modifies the transition data (t_data) such that when the selected transition type is being effected, an incremental removal of at least a part of the first image by the second image occurs serially until the first image has been removed in its entirety to reveal the second image on a display 18 of gaming machine 20.

Figure 2:
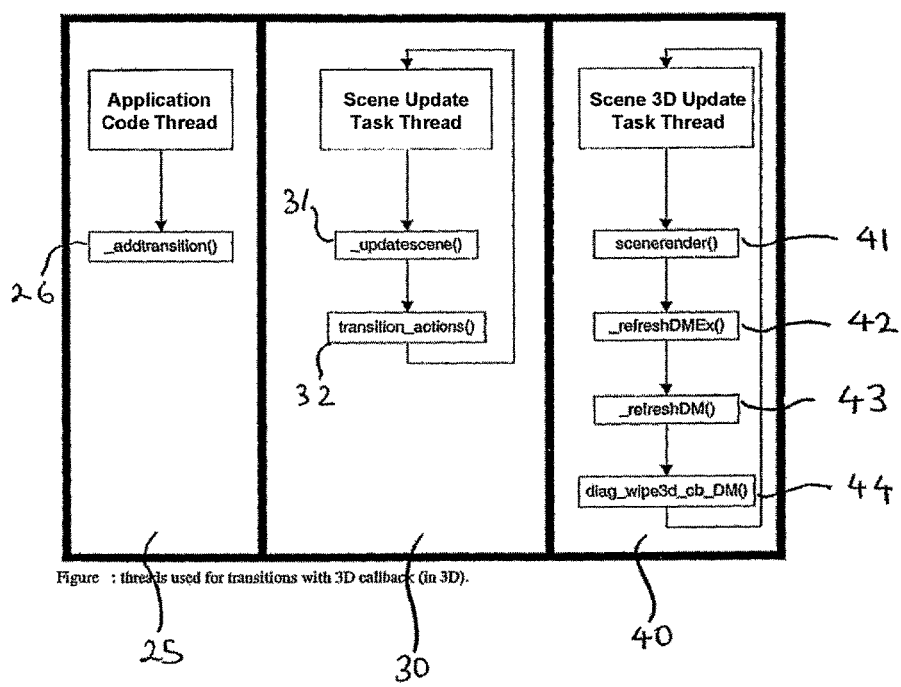
FIG. 2 is a process flow diagram of a 3D transition using 3D callback.

FIG. 2 is a process flow diagram of a 3D transition using 3D callback. Graphics engine 14 (shown in FIG. 1) executes an application code thread 25, a scene_update_task thread 30, and a scene3d_update_task thread 40. There are three main functions to facilitate image transitions. Firstly, application code thread 25 has a _addtransition( ) function 26 which selects a transition and initializes its transition data (t_data) structure and attaches it to an image. Secondly, scene_update_task thread 30 has a _updatescene( ) function 31 which interrogates images within the scene list to determine whether they have transition data (t_data). Thirdly, if transition data (t_data) is found, a transition_actions( ) function 32 of scene_update_task thread 30 is called to maintain and/or update the selected transition.

Scene3d_update_task thread 40 is used for 3D images and is provided with functions including scenerender( ) 41, _refreshDMEx( ) 42, refreshDM( ) 43 and a 3D transition callback function, diag_wipe3d_cb_DMO 44. Scene3d_update_task thread 40 calls _refreshDM( ) 43 to call 3D transition callback function 44. Callback function 44 uses the transition data (t_data) attached to the image to draw the selected transition via OpenGL calls. For any individual transition, application code thread 25 and scene_update_task thread 30 cannot run concurrently. Also, scene3d_update_task thread 40 and scene_update_task thread 30 cannot run concurrently.

Addtransition( )

Application code thread 25 calls _addtransition( ) function 26 (shown in FIGS. 2, 4 and 5) to attach the selected transition to an image. Applying a transition to an image requires the name and position of the subject image to be known. Unless these are correct, the transition command is ignored. The command itself both identifies the subject image and specifies the transition parameters as shown in the code below:

```
Transition_scene_id = addtransition
(
    image identifier,
    screen position x,
    screen position y,
    transition type,
    direction,
    duration
)
```

The variable "Transition_scene_id" is used with the existing graphics commands to both start and reset the transition at desired times. Resetting a transition is useful to reveal several consecutive images, or if the transition has been interrupted by another gaming machine event.

When _addtransition( ) 26 is called, the selected transition assumes that the image already exists in the scene list and a display manager. An example of calling _addtransition( ) function 26 is shown below:

```
H_OBJECT tmp;
tmp = getobjecthandle("IMG_SYM_TEN", _IMAGE);
s_id1 = addscene(tmp, 100, 100, 0, 0, HIGHER_PRI);
t_id1 = addtransition(tmp, 100, 100, SLIDE, TOP_LEFT, 3200);
_controlscene(s_id1, SCENE_START);
_controlscene(t_id1, SCENE_START_TRANS);
```

The transition (t_id1) is added in the same position that the image exists in for the scene (s_id1). If this procedure is not met, then addtransition( ) 26 will fail. The following code extract describes how _addtransition( ) 26 searches for the resource in the display manager and checks if the resource is in the same location that the user wants to attach the transition to.

```
DmItem = FindResourceDM(pImage->hDc, -1);
_getitempositionDM(DmItem, &Rect);
while (DmItem != -1)
{
    if (Rect.top == yPos && Rect.left == xPos)
    {
        _getscenedataDM(DmItem, &scene_id);
        break;
    }
    else
    {
        DmItem = FindResourceDM(pImage->hDc, DmItem);
        _getitempositionDM(DmItem, &Rect);
    }
}
...
// Could not find the object at that spot.
    if (DmItem == -1)
        return GRERROR;
```

Next, _addtransition( ) 26 adds a duplicate of the image to the scene list so that _addtransition( ) 26 can modify the duplicate image for the transition. In addition, _addtransition( ) 26 initializes all transition data (t_data) variables for the associated duplicate image. Below is a code extract that details the initialization of the transition data (t_data).

```
scene_list[new_scene_index].t_data = (TRANS_ITEM *)
_avlmalloc(sizeof(TRANS_ITEM))
```

```
scene_list[new_scene_index].t_data->swansong = swansong;
scene_list[new_scene_index].t_data->direction = dir;
scene_list[new_scene_index].t_data->duration = dur;
scene_list[new_scene_index].t_data->status =
NOT_YET_STARTED;
scene_list[new_scene_index].t_data->curr_x = 0;
scene_list[new_scene_index].t_data->curr_y = 0;
scene_list[new_scene_index].t_data->generic1 = 0;
scene_list[new_scene_index].t_data->generic2 = 0;
scene_list[new_scene_index].t_data->generic3 = 0;
scene_list[new_scene_index].t_data->generic4 = 0;
scene_list[new_scene_index].t_data->generic5 = 0;
scene_list[new_scene_index].t_data->generic6 = 0;
scene_list[new_scene_index].t_data->cllbckDMitem = −1;
scene_list[new_scene_index].t_data->randomlist = (NLIST *) 0;
scene_list[new_scene_index].t_data->randomlist3D = (int *) 0;
```

Many of the variables within the t_data structure are dependent on the type of transition chosen; however, some are present for all transitions. Below is a table explaining the variables of the t_data structure.

| T data variable | .Meaning |
| --- | --- |
| swansong | Type of transition. |
| direction | Depends on transition chosen as different transitions have different subtypes/directions. |
| duration | Length of transition. |
| status | Current state of the transition |
| generic! - generic6 | All these variables are different for each transition. |
| cllbckDMitem | This refers to the callback function that is attached to the transition in3D mode when a Window is created. |
| random.list | This is the list of squares to be removed. Specific for the SCATTER transition in 2D mode. |
| randomlist3D | This is the list of squares to be removed. Specific for the SCATTER transition in 3D mode. |

If the selected transition requires modification of the original image, for example, the "Iris Wipe" transition, an offscreen device context (DC) is created for a duplicate transition image. Below is a list of transitions that do not require an offscreen device context to be created.

| Transition | .2D/3D |
| --- | --- |
| ROTATE | |
| SHRINK | ANY |
| SLIDE | |
| FADE | 3D |
| WIPE | ANY. Wipes in left, right, up and down do not need to create a DC as micro clipping is performed and this does not affect the original image. |
| IRIS | 3D |
| SCATTER | 3D |
| CURTAIN | 3D |

Figure 3:
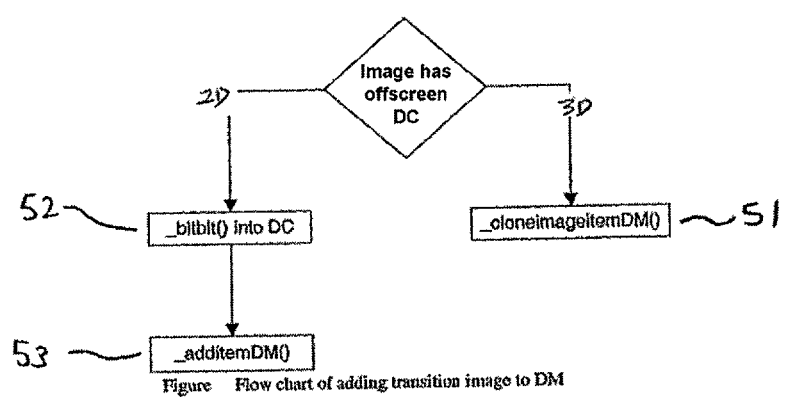
FIG. 3 is a process flow diagram of adding a transition image to a display manager.

FIG. 3 is a process flow diagram of adding a transition image to the display manager. When an offscreen device context has been created for a duplicate transition image, the original image is removed. In 3D mode after the offscreen device context has been created, cloneimageitemDM( ) 51 is called which adds the transition image device context to the display manager. However, in 2D mode, a _bitblt( ) 52 is done to copy the duplicate image to the device context. Next, _additemDM( ) 53 is called to add the transition image device context to the display manager.

For error handling purposes, applying a transition to a resource other than an image results in _addtransition( ) 26 (shown in FIGS. 2, 4, and 5) returning an error.

Updatescene( )

In the image transition process, updatescene( ) function 31 (shown in FIGS. 2, 4, and 5) is called for each refresh of gaming display 18. Also, each image to be displayed is checked to see if it contains any transition data. If the image contains transition data (t_data) and the transition is in progress, transition_actions( ) 32 is called as shown in the code extract below:

```
if (scene_list[i].t_data != 0 && scene_list[i].t_data->status ==
IN_PROGRESS)
    transition_actions(i, &callback_reqd);
```

Transition_actions( )

Figure 4:
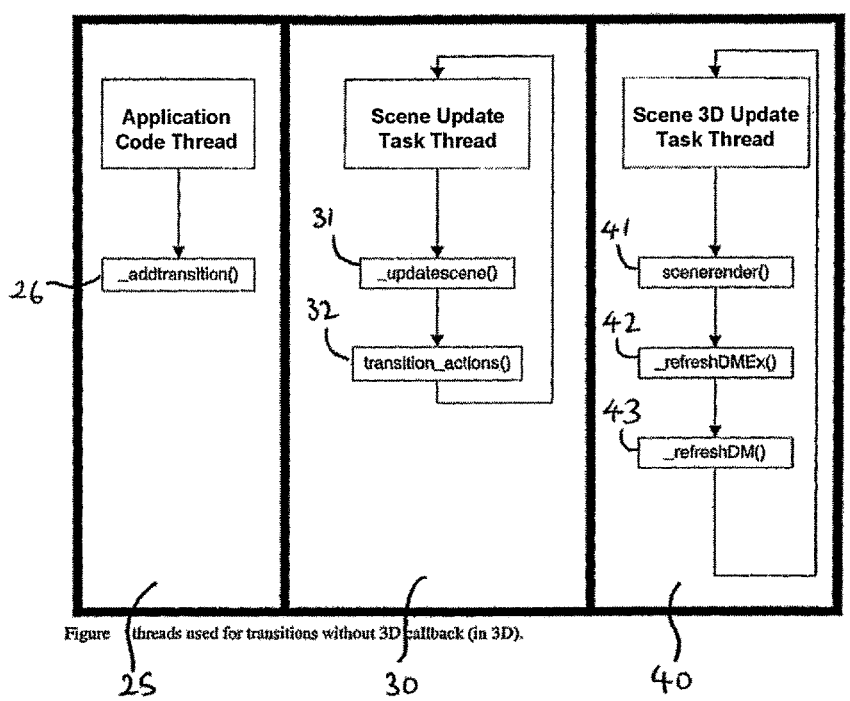
FIG. 4 is a process flow diagram of a 3D transition not using 3D callback.
Figure 5:
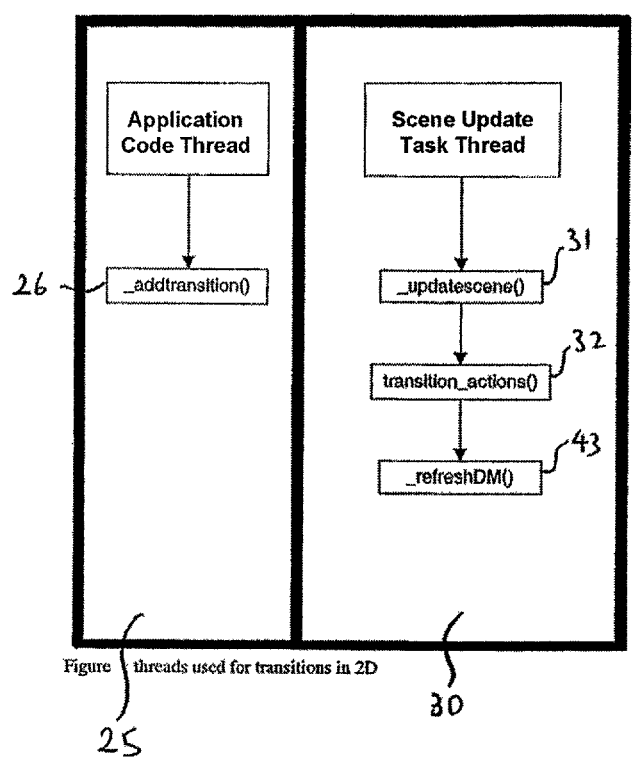
FIG. 5 is a process flow diagram of a 2D transition.

Transitions are maintained and updated by transition_actions( ) function 32 (shown in FIGS. 2, 4, and 5). Transitions can be updated using pixel operations or whole image operations, for example, scaling. Transition_actions( ) function 32 modifies all the transition data (t_data) for the next refresh of display 18. Each individual transition contains unique algorithms and procedures to remove parts of the image from display 18. However, some of the transitions within transition_actions( ) 32 only have a 2D implementation. Other transitions have a 2D and 3D implementation. The transitions that are only available in 2D use 3D callback function 44 (shown in FIG. 2) to cater for those transitions in 3D mode.

If in 3D mode, the first time transition_actions( ) 32 is called, a display manager window is created at the location of the image and attaches 3D callback function 44 to the window. At every refresh, transition_actions( ) 32 modifies the t_data. Also, 3D callback function 44 attached to the window processes the t_data structure and implements the transition using OpenGL calls. The code extract below illustrates an initialization of the display manager window with a scatter-3D_cbDM( ) callback 44.

```
scene_list[i].t_data->cllbckDMitem = _addwindowDM
(
    Rect.left,
    Rect.top,
    scatter_3D_cbDM,
    DI_ALPHA,
    i,
    get_priority(i),
    Rect.top>=0?DM_BOTTOM_SCREEN:DM_TOP_SCREEN
);
```

Below is a list of associated 3D callback functions 44 for each transition.

| Transition | 3D. Callback |
| --- | --- |
| WIPE (any diagonal direction) | diag wipe 3D cbDM |
| SCATTER | scatter 3D cbDM |
| IRIS | iris 3D cbDM |
| CURTAIN (type 2) | curtain2 3D cbDM |
| CURTAIN (type 1) | curtain! 3D cbDM |

Not all transitions require their own callbacks 44 in 3D mode. This is determined according to the implementation or specification of individual transitions. For example, the Wipe transition in any non-diagonal direction uses micro clipping. Thus, for this transition there is no need for OpenGL operations.

FIG. 4 is a process flow diagram of a 3D transition not using 3D callback. In FIG. 4, _refreshDM( ) 43 does not call a 3D transition callback 44 since transition_actions( ) 32 has ensured that the transition data (t_data) has been updated or modified for the next refresh of display 18. This is different to the scenario shown in FIG. 2. Also, in this scenario, application code 25 and scene_update_task 30 threads do not run concurrently and scene3d_update_task thread 40 also does not run concurrently.

FIG. 5 is a process flow diagram of a 2D transition. In FIG. 5, _refreshDM( ) 43 is called in the context of scene_update_task thread 30. There are also no 3D callbacks in 2D mode and transition_actions( ) 32 has ensured that the transition data (t_data) is updated and modified for the next refresh. Also, application code 25 and scene_update_task( ) 30 threads do not run concurrently.

Figure 6:
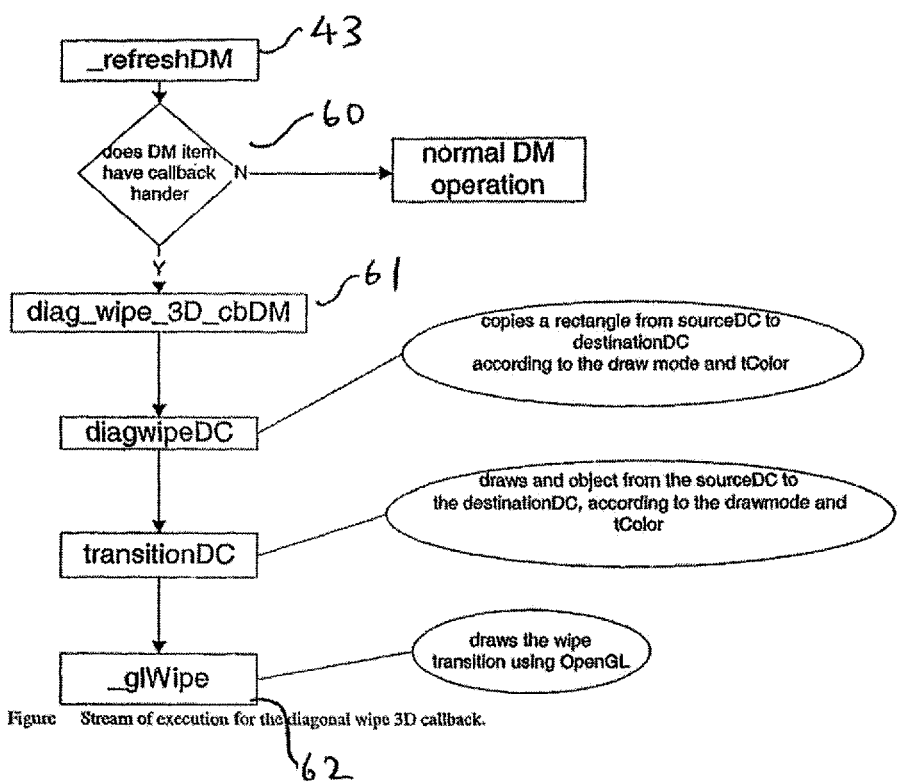
FIG. 6 is a process flow diagram of a diagonal wipe 3D callback.

FIG. 6 is a process flow diagram of a diagonal wipe 3D callback. In FIG. 6, _refreshDM( ) 43 is called in the stream of execution for the diagonal wipe transition. When _refreshDM( ) 43 is called, each display manager item is drawn and checked to see if it has a draw handler attached 60. If the image has a transition attached to it then the attached draw handler is initiated 61. In the diagonal wipe transition, diag_wipe-3D_cbDM( ) is called 61. The Wipe transition is drawn using OpenGL calls 62. The code extract below illustrates the operation of _refreshDM( ) 43 with draw handlers.

```
for (i = 1; i < DmItemsUsed; i++)
{
    ...
    if (pItem->pDrawHnd && (pItem->WhichScreen &
    DM_BOTTOM_SCREEN))
    {
        (pItem->pDrawHnd) (hBack,
        pItem->Rect.left,
        pItem->Rect.top,
        pItem->DrawMode,
        pItem->Val);
        continue;
    }
}
```

Figure 7:
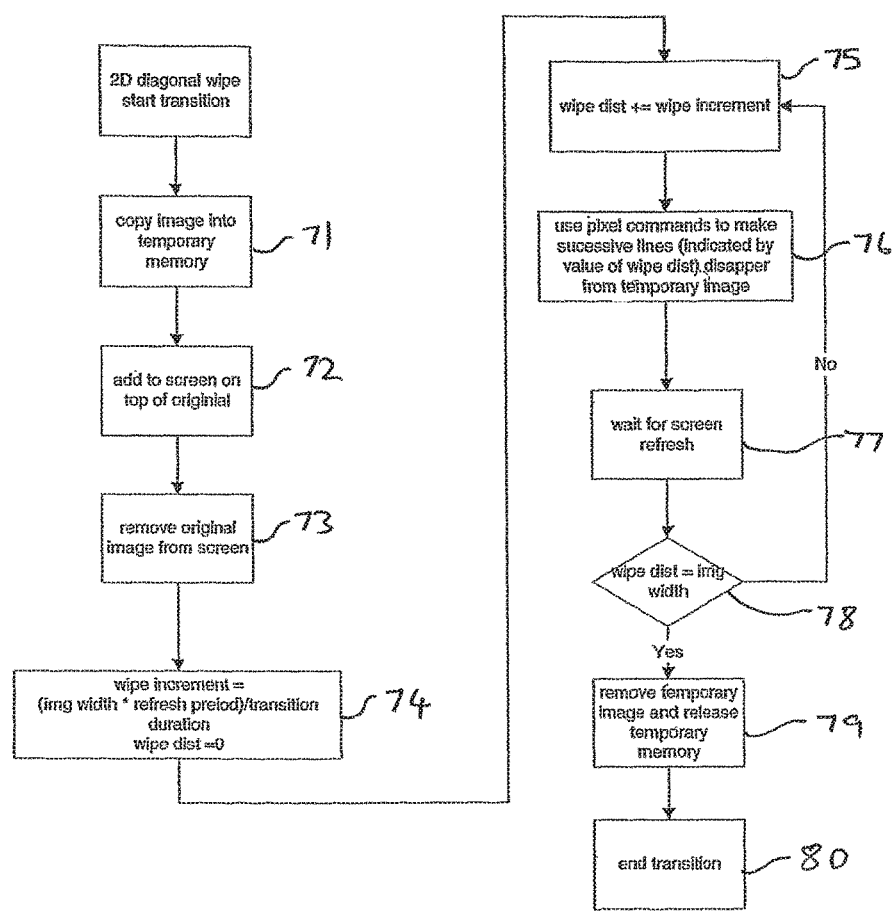
FIG. 7 is a process flow diagram of a 2D diagonal wipe transition.

FIG. 7 is a process flow diagram of a 2D diagonal wipe transition. The original image is copied into temporary memory 71 for a diagonal wipe transition in 2D mode. The duplicate image is added to display 18 over original image 72 and the original image is removed 73 from display 18. The wipe increment is calculated according to the formula shown at 74. The amount of the image that has been "wiped" is stored in the variable wipe dist, and is incremented at 75. Then, pixel commands cause successive lines to disappear from temporary image 76 on display 18. When waiting 77 for the next refresh of display 18, the variable wipe dist is compared with the variable img width to determine if more "wiping" is necessary 78. If the value of wipe dist is not equal to the img width variable, steps 75 to 78 are repeated. However, if wipe dist is equal to img width, the temporary image is removed and the temporary memory is released 79 ending the transition 80.

In 3D mode, different commands are used for step 76 instead of pixel commands to draw the transition. For example, OpenGL triangle commands could be used.

Scatter Transition Example

The Scatter transition receives a value (direction parameter) from _addtransition( ) function 32. The direction parameter value is the size of the individual scattered squares, which is represented as a 1000th of a percent of the image area. For example, a value of 2500 is a square size that is 25% of the image area. The Scatter transition then determines the number of squares needed for the transition and calculates the position of the top left corner of each square 81 and assigns this value to each square.

Figure 8:
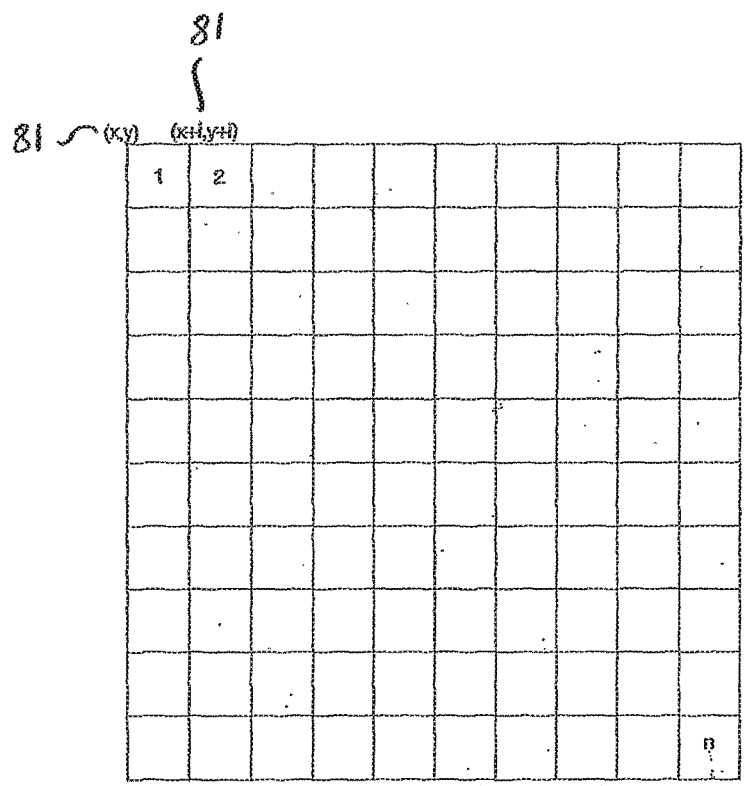
FIG. 8 illustrates a scatter transition separating an image.

FIG. 8 illustrates the separation of the image by the Scatter transition. The lists of squares (1-n) are randomly selected so that a random square is deleted from the image. The t_data structure for the Scatter transition has eight variables that are used for cumulative transition calculations. It is not known until the implementation of the transition algorithm is complete whether more variables are required.

Transition_actions( ) 32 (shown in FIGS. 2, 4, and 5) is modified for the Scatter transition. This modification includes the transition algorithm and the correct timing, so that the transition is completed within a user specified time. Below is an excerpt of the initialization of the scatter transition in transition_actions( ) 32.

```
case SCATTER:
{
    if (t_data->generic1 == 0 && t_data->generic2 == 0)
    {
        /* get square size based on area of image */
        img_area = width * height;
        square_size = img_area * t_data->direction / 10000;
        // generic5 is the square size.
        square_size = t_data->generic5 =
        mborg_isqrt((long)square_size);
        // generic3 is the number of x divisions. generic4 is the number
        of y divisions
        t_data->generic3 = (width % square_size != 0) ? width /
        square_size + 1 width / square_size;
        t_data->generic4 = (height % square_size != 0) ? height /
        square_size + 1 height / square_size;
        no_of_squares = t_data->generic3 * t_data->generic4;
        /* allocate space for rand numbers */
        t_data->randomlist =
        avlmalloc(sizeof(NLIST)*no_of_squares);
        make_rand_array(square_size, no_of_squares,
        t_data->randomlist, width, t_data- >generic3);
    if (Is3D)
    {
        RECT Rect;
        _getitempositionDM(scene_list[i].imagelist[0], &Rect);
        scene_list[i].t_data->cllbckdDMitem = addwindowDM
        (
            Rect.left,
            Rect.top,
            scatter_3D_cbDM,
            DI_ALPHA,
            i,
            get_priority(i),
            Rect.top>=0
            ?DM_BOTTOM_SCREEN:DM_TOP_SCREEN
        );
        _invalidateitemDM(scene_list[i].t_data->cllbckDMitem, 0);
        uninvalidateitemDM(scene_list[i].imagelist[0]);
        t_data->randomlist3D = avlmalloc(sizeof(int) *
        no_of_squares);
        for (j = 0; j < no_of_squares; j++)
            t_data->randomlist3D[j] = 1;
    }
}
...
```

To illustrate the process of initialization, the code above is executed once at the start of the transition to split up the image into numbered squares, as shown in FIG. 8. Also, during initialization, a display manager window is created for a 3D callback 44 (shown in FIG. 2).

Generally, each transition has a shape that is derived from the transition. For example, the iris wipe transition has a circle and the wipe has a line. For the Scatter transition, this is a square. In relation to timing, the number of squares to remove per refresh period is based on the duration value passed from _addtransition( ) 26 (shown in FIGS. 2, 4, and 5). The code extract below illustrates the number of squares to remove per refresh period (spf).

```
/* timing */
lpf_1000 = ((no_of_squares * fbp) / t_data->duration);
t_data->generic2 += lpf_1000;
spf = t_data->generic2 / 1000;
t_data->generic2 %= 1000;
```

The lpf-1000 variable holds the squares to remove per refresh period ×1000 to reduce rounding errors. The lpf-1000 variable is added to the t_data->generic2 variable which is divided by 1000 to produce the final value for the number of squares to be removed for the current refresh period (spf). The remaining lines are stored in t_data->generic2 for the next refresh period.

Once the spf is calculated, a "for" loop is executed to remove a certain number of squares from the image per refresh period. The following code segment illustrates this.

```
for(j=0;j<spf;j++)
{
    /* create random rectangle to clear */
    area.left = t_data->randomlist[t_data->generic1].x - x_offset;
    area.top = t_data->randomlist[t_data->generic1].y - y_offset;
    area.right = t_data->randomlist[t_data->generic1].x +
        t_data->generic5 - x_offset;
    area.bottom = t_data->randomlist[t_data->generic1].y +
        t_data->generic5 - y_offset;
    /* for squares that fall off the DC */
    area.left = (area.left <0) ? 0 : area.left;
    area.top = (area.top <0) ? 0 : area/top;
    area.right = (area.right > width) ? width : area.right;
    area.bottom = (area.bottom > height) ? height : area.bottom;
    SoftFill(scene->playDc[0],&area,0);
    t_data->generic1++;
    if(t_data->generic1 == no_of_squares)
    {
    remove=TRUE;
    /* free all dynamic allocated memory */
    _avlfree(t_data->randomlist);
    t_data->randomlist = (NLIST *) 0;
    break;
    }
}
```

Figure 9:
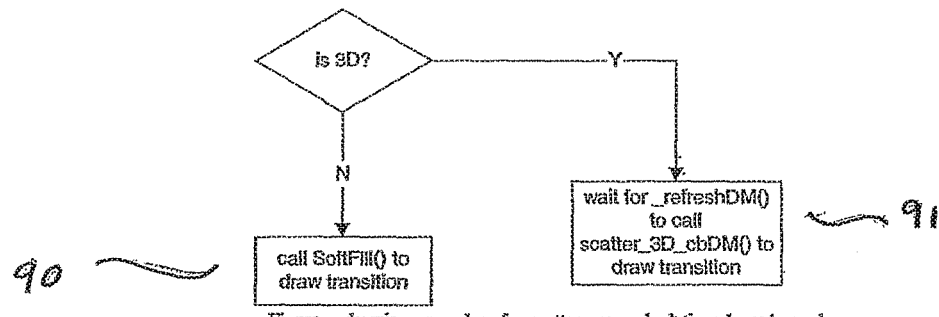
FIG. 9 is a process flow diagram for the drawing procedure of the Scatter transition.
Figure 10A:
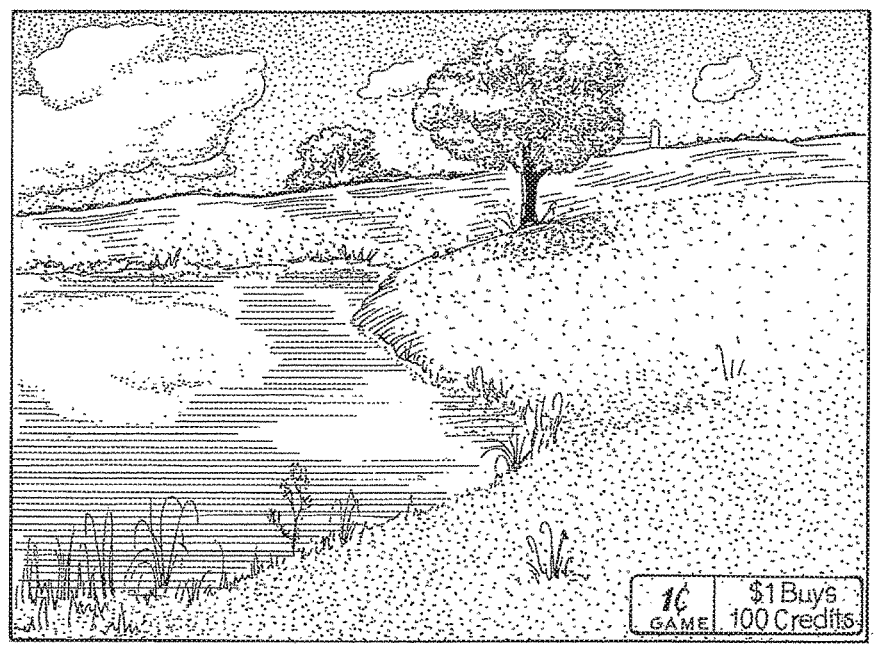
FIGS. 10a-e are a series of images illustrating the Wipe transition.
Figure 10B:
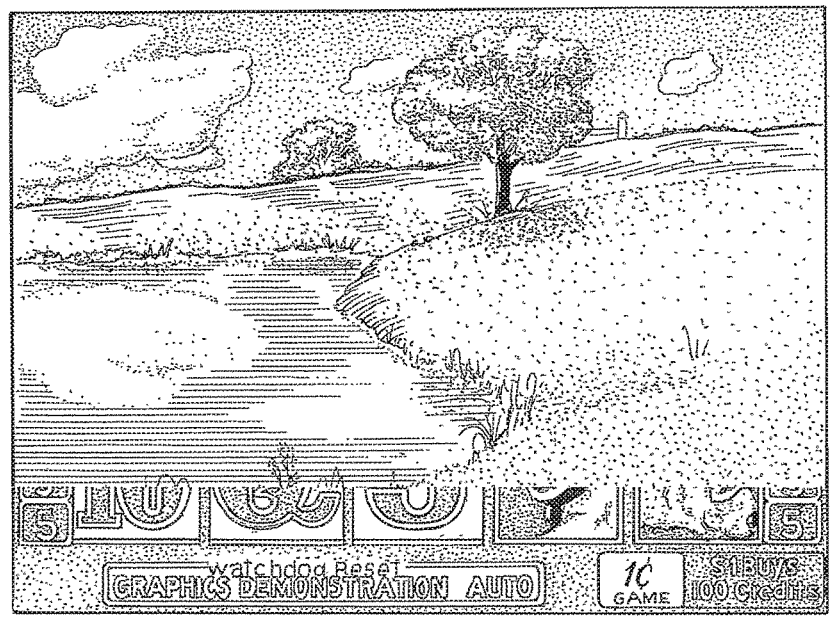
Figure 10C:
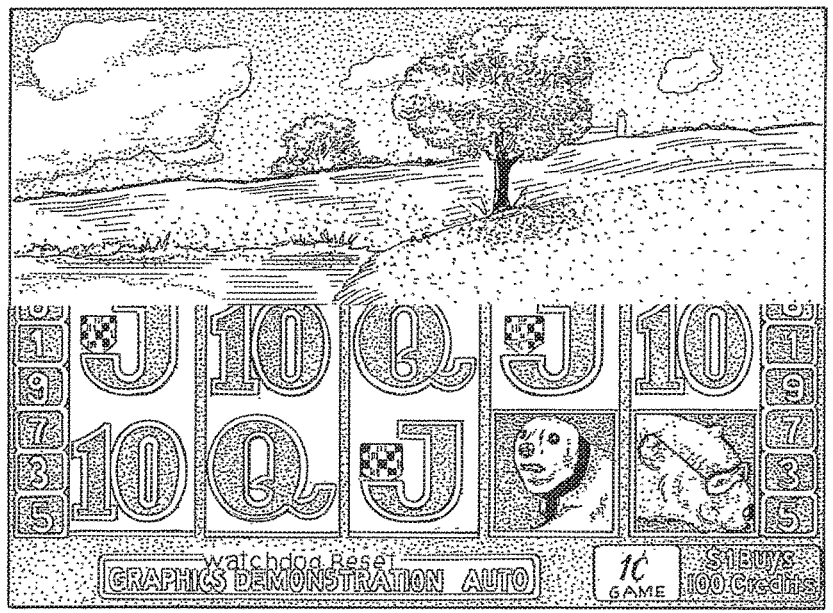
Figure 10D:
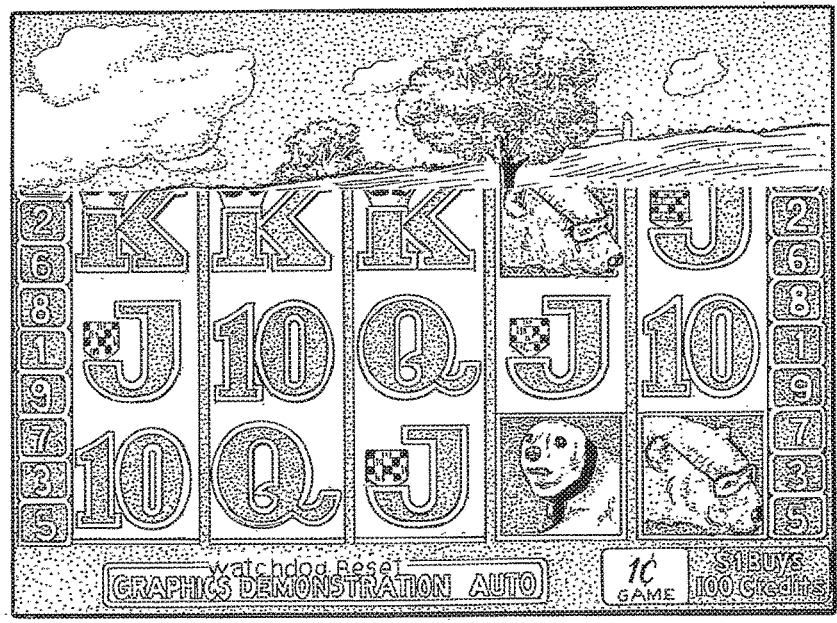
Figure 10E:
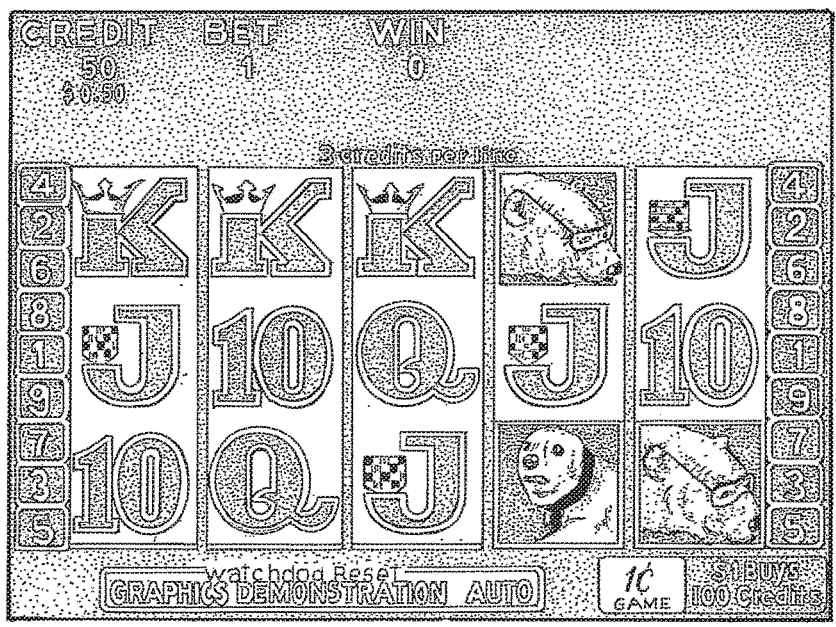
Figure 11A:
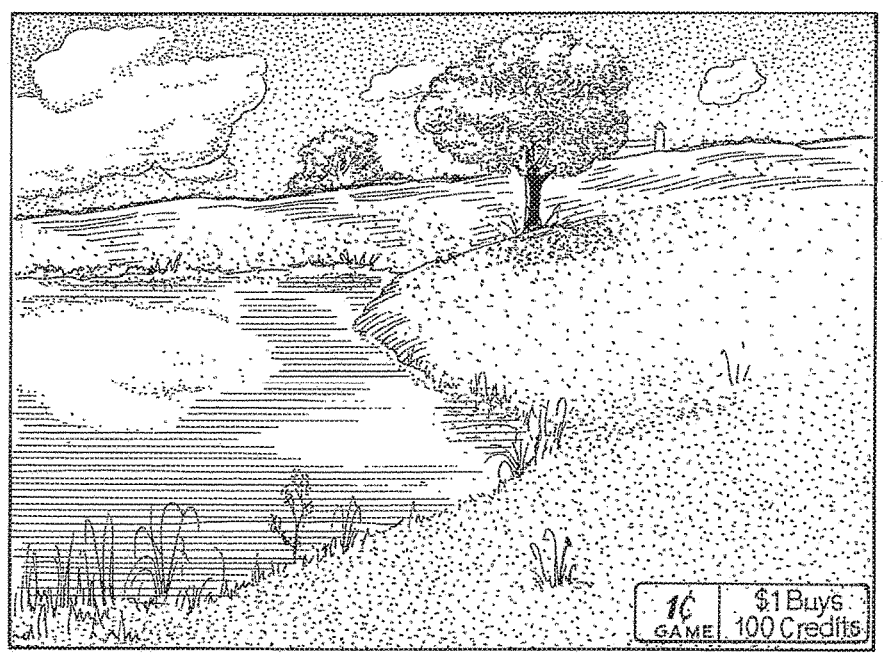
FIGS. 11a-e are a series of images illustrating the Fade transition.
Figure 11B:
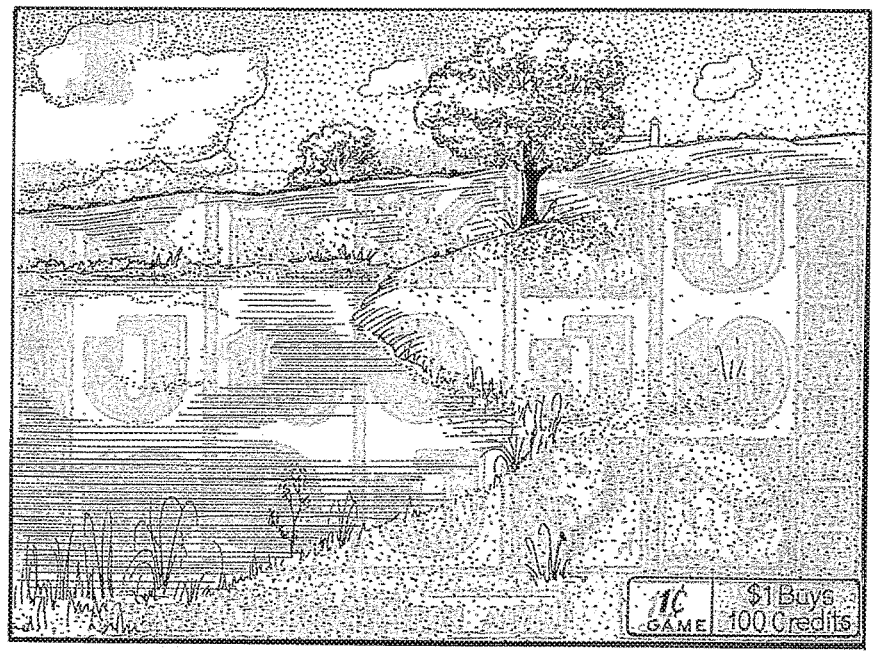
Figure 11C:
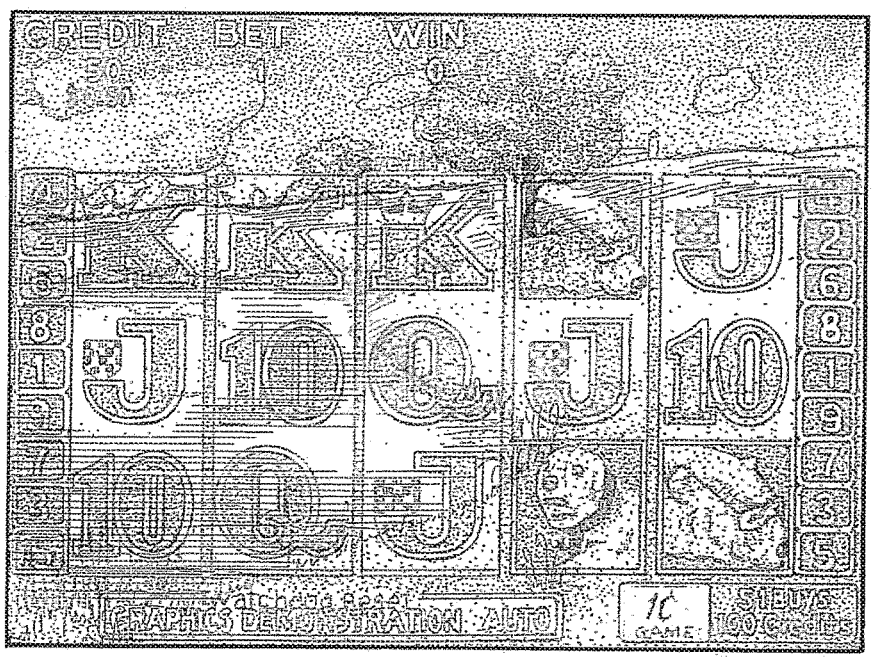
Figure 11D:
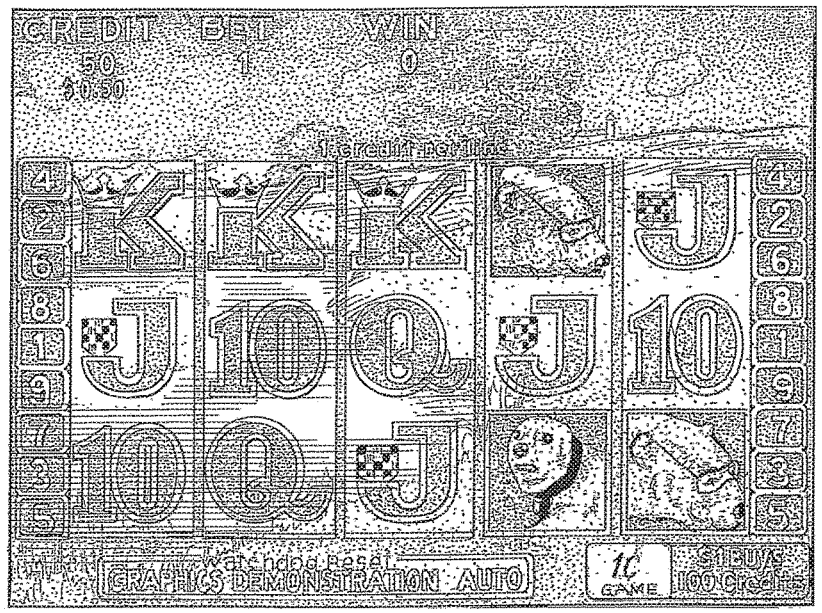
Figure 11E:
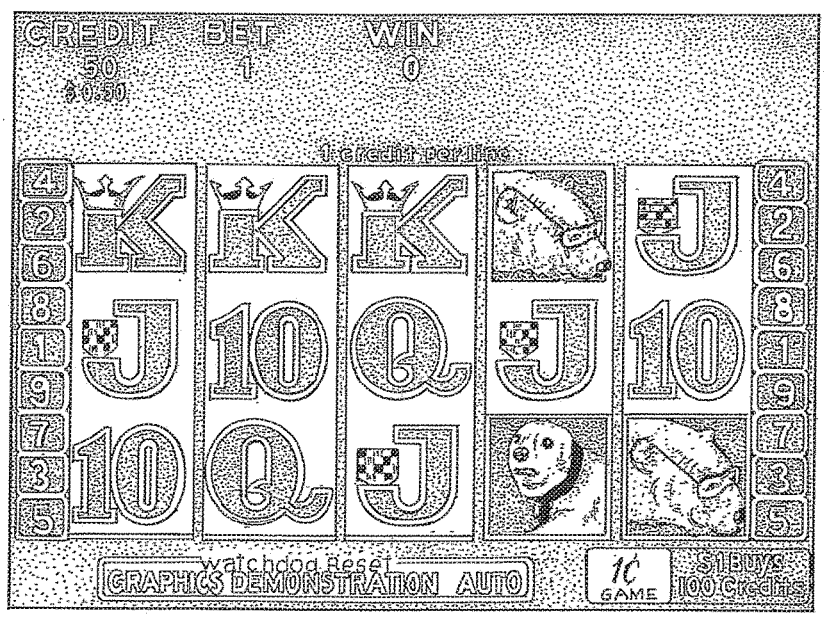
Figure 12A:
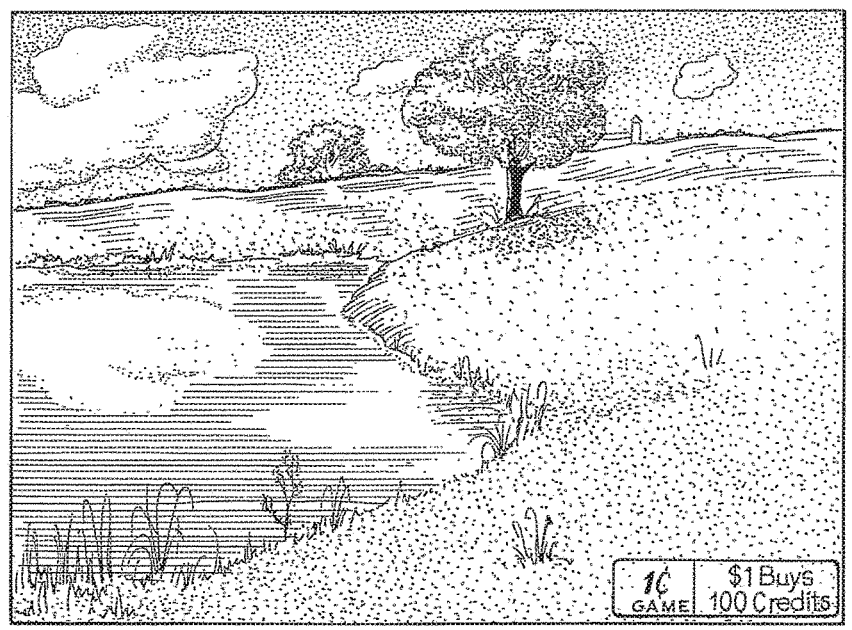
FIGS. 12a-e are a series of images illustrating the Iris transition.
Figure 12:
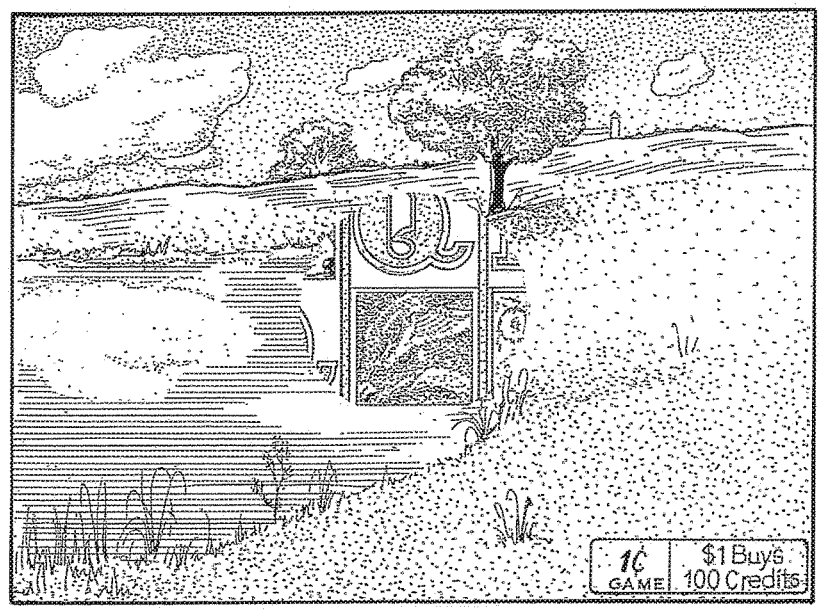
Figure 12C:
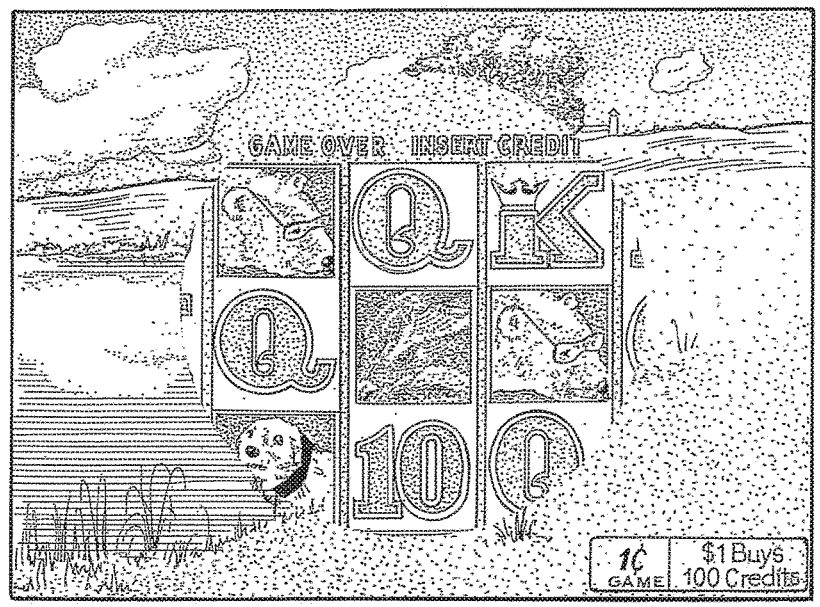
Figure 12D:
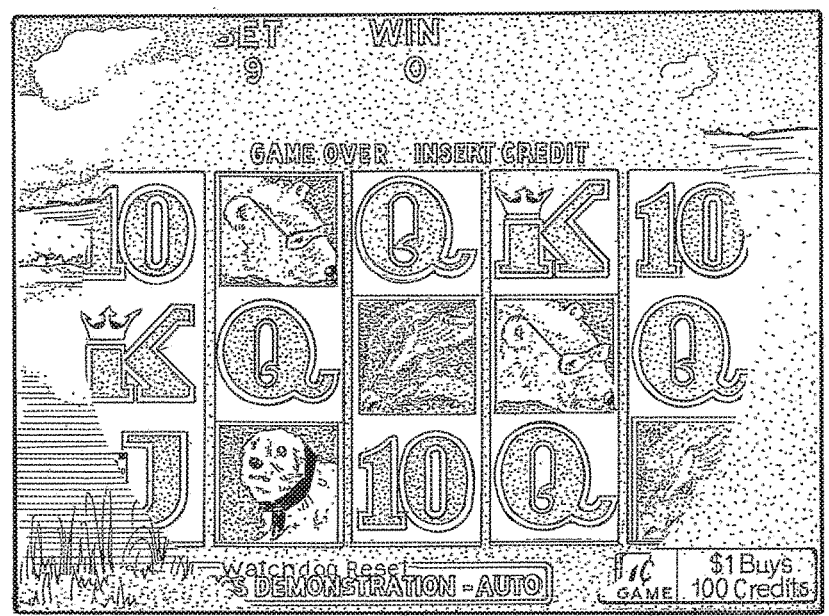
Figure 12E:
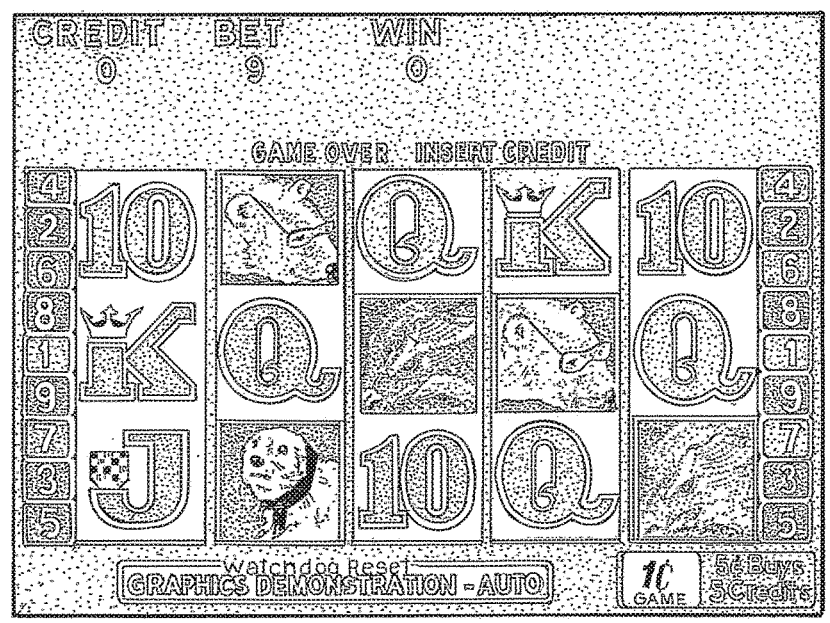

FIG. 9 is a process flow diagram for the drawing procedure of the Scatter transition. There are different drawing procedures depending on whether the transition is in 2D mode or 3D mode. In 2D mode, SoftFill( ) 90 is called to fill a rectangle. FIG. 8 illustrates the division of the image into many smaller squares. A random number is chosen and the rectangle coordinates are calculated and put into a RECT structure. SoftFill( ) function 90 is called in the following way:

SoftFill(scene->playDc[0],&area,0);

SoftFill( ) 90 instructs the current device context to set each pixel to '0' in the given rectangle 'area'. The for loop may get executed ri times per refresh period. In this case, SoftFill( ) 90 fills n rectangles that are chosen randomly at each refresh period.

In 3D mode, a specific 3D callback, scatter-3D_cbDM 44 is celled 91 via _refresbDM( ) 43. This function 44 which performs its own OpenGL operations and divides the image into little triangles forming squares. To draw the transition image, less and less of the image is drawn each refresh period.

When the transition has ended it is removed from the display manager. In 2D mode, t_data->generic1 is incremented each time SoftFill( ) function 90 is called in the for loop. The t_data->generic1 variable indicates the number of squares that have been removed already. When the t_data->generic1 variable reaches the number of squares that exist, the image is removed. The code extract below illustrates this:

```
if(t_data->generic1 == no_of_squares)
{
    remove=TRUE;
    /* free all dynamic allocated memory */
    _avlfree(t_data->randomlist);
    t_data->randomlist = (NLIST *) 0;
    break;
}
```

Once the remove variable is set to true, transition_actions( ) 32 (shown in FIGS. 2, 4, and 5) removes the transition from the display manager and cleans up the code. The user may also want cleaned up code, as shown in the code extract above. The cleaned up code also frees the memory that was allocated for the random list of integers.

Although the Scatter transition has been described, it will be appreciated that other transitions are also envisaged. New transitions can be added by:

modifying the t_data structure to add additional t_data variables, adding the transition algorithm and timing to the transition_actions( ) function 32, and if necessary, creating a 3D callback 44 with the transition algorithm and timing.

FIGS. 10a-e are a series of images illustrating the Wipe transition. A landscape image is gradually removed line by line from the bottom of the image, gradually exposing the underlying graphics.

FIGS. 11a-e are a series of images illustrating the Fade transition. The image gradually fades until it is no longer visible.

FIGS. 12a-e are a series of images illustrating the Iris transition. The landscape image is gradually removed by the appearance of a "hole" in the middle of the image. The hole grows until the entire image is replaced and the underlying graphics wholly exposed.

Modifications and variations as would be apparent to a skilled addressee are deemed to be within the scope of the present invention.

One or more of the components of the systems and/or blocks of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method blocks and/or perform the blocks in a different order than the order listed. For example, some blocks may not be performed in certain embodiments of the present invention. As a further example, certain blocks may be performed in a different temporal order, including simultaneously, than listed above.

Certain examples include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Examples can be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Examples can also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of transitioning from a first image to a second image on an electronic display of a gaming machine without the use of any pre-generated animation data file, the gaming machine including a transition library, a graphics engine, and a user interface, the method comprising:
   displaying, on the electronic display, the first image;
   receiving, at the user interface, a user command associated with game play of a game;
   identifying, via the graphics engine, the second image to be displayed in response to the received user command;
   overlaying the first image over the second image;
   selecting, via the graphics engine, a visual transition from a plurality of predefined visual transitions stored in the transition library;
   associating, via the graphics engine, the first image with display control data for the selected visual transition from the first image to the second image;
   extracting, via the graphics engine, a first set of details from the display control data that are associated with a discrete visual change related to the selected visual transition, the details including specified parameters for applying the selected visual transition;
   incrementally removing the overlaid first image to reveal the second image using the following steps:
      processing, via the graphics engine, the first set of details with the first image to apply the discrete visual change of the selected visual transition to a first part of the first image;
      updating, via the graphics engine, the display control data subsequent to making the discrete visual change to the first image to generate updated display control data;
      extracting, via the graphics engine, a second set of details from the updated display control data that are associated with a second discrete visual change related to the selected visual transition;
      processing the second set of details with the first image to apply the second discrete visual change of the selected visual transition to a second part of the first image; and
      displaying, by the graphics engine on the electronic display, at least a part of the second image made visible by the applying of the discrete visual change and the second discrete visual change to the first image, wherein, as a result, the part of the second image is made visible without the use of any pre-generated animation data file.

2. The method as claimed in claim 1, wherein displaying the first image comprises displaying an idle screen image.

3. The method as claimed in claim 2, wherein identifying the second image comprises identifying a game screen image associated with game play of a base game.

4. The method as claimed in claim 1, wherein receiving the user command comprises receiving user input at a credit input mechanism.

5. The method as claimed in claim 1, wherein receiving the user command comprises receiving a selection of one or more controls at the user interface.

6. The method as claimed in claim 1, wherein displaying the first image comprises displaying a game screen image associated with game play of a base game.

7. The method as claimed in claim 6, wherein identifying the second image comprises identifying a game screen image associated with game play of a bonus game.

8. The method as claimed in claim 7, wherein the user command initiates the game play of the bonus game.

9. A gaming machine configured to transition from a first image to a second image without the use of any pre-generated animation data file, the gaming machine comprising:
   an electronic display configured to display the first image;
   a non-transitory memory configured to store a transition library including a plurality of predefined visual transitions;
   a user interface configured to receive a user command associated with game play of a game; and
   a graphics engine configured to at least:
      identify the second image to be displayed on the electronic display in response to the user command;
      overlay the first image over the second image;
      select a visual transition from the plurality of predefined visual transitions;
      associate the first image with display control data for the selected visual transition from the first image to the second image;
      extract a first set of details from the display control data that are associated with a discrete visual change related to the selected visual transition, the details including specified parameters for applying the selected visual transition;
      incrementally remove the overlaid first image to reveal the second image using the following steps:
         process the first set of details with the first image to apply the discrete visual change of the selected visual transition to a first part of the first image;
         update the display control data subsequent to making the discrete visual change to the first image to generate updated display control data;
         extract a second set of details from the updated display control data that are associated with a second discrete visual change related to the selected visual transition;
         process the second set of details with the first image to apply the second discrete visual change of the selected visual transition to a second part of the first image; and
      display, on the electronic display, at least a part of the second image made visible by the applying of the discrete visual change and the second discrete visual change to the first image, wherein, as a result, the part of the second image is made visible without the use of any pre-generated animation data file.

10. The gaming machine as claimed in claim 9, wherein the first image comprises an idle screen image.

11. The gaming machine as claimed in claim 10, wherein the second image comprises a game screen image associated with game play of a base game.

12. The gaming machine as claimed in claim 9, further comprising a credit input mechanism, wherein the user command comprises user input to the credit input mechanism.

13. The gaming machine as claimed in claim 9, wherein the user interface comprises at least one selectable control, and wherein the user command comprises selection of at least one selectable control.

14. The gaming machine as claimed in claim 9, wherein the first image comprises a game screen image associated with game play of a base game.

15. The gaming machine as claimed in claim 14, wherein the second image comprises a game screen image associated with game play of a bonus game.

16. The gaming machine as claimed in claim 15, wherein the user command comprises a user command that initiates the game play of the bonus game.

* * * * *